United States Patent [19]

Kondo et al.

[11] Patent Number: 4,953,656
[45] Date of Patent: Sep. 4, 1990

[54] OFFSET DRIVE FOR BALLOON TIRED MOTORCYCLE

[75] Inventors: Hiroshi Kondo, Iwata; Tadao Okada, Fukuroi, both of Japan

[73] Assignee: Yamaha Hatsudoki Kabushuki Kaisha, Iwata, Japan

[21] Appl. No.: 834,607

[22] Filed: Feb. 28, 1986

[30] Foreign Application Priority Data

Mar. 4, 1985 [JP] Japan .................. 60-41206

[51] Int. Cl.$^5$ .............................................. B62M 7/02
[52] U.S. Cl. .................................................... 180/226
[58] Field of Search ................ 180/226, 219; 280/260, 280/281 W

[56] References Cited

U.S. PATENT DOCUMENTS

| | | | |
|---|---|---|---|
| 1,385,249 | 7/1921 | DuBrie | 180/226 |
| 2,316,477 | 4/1943 | Weaver | 180/226 |
| 4,436,173 | 3/1984 | Takashi | 280/260 |

FOREIGN PATENT DOCUMENTS 49-27375  7/1974  Japan .
58-131853 7/1983  Japan .

*Primary Examiner*—Charles A. Marmor
*Attorney, Agent, or Firm*—Ernest A. Beutler

[57] ABSTRACT

Two embodiments of off the road motorcycles embodying low pressure balloon tires. In each embodiment, an improved final drive arrangement is provided that includes a ring gear that is disposed substantially inwardly of the outer periphery of the rear wheel to provide a relatively compact final drive housing to facilitate leaning of the motorcycle. In one embodiment, the ring gear is driven by a pinion gear that is directly affixed to one end of a drive shaft and which is driven at its other end from the engine by means of a chain drive. In the other embodiment, the ring gear is driven by a pair of transfer spur gears from a drive shaft that is articulated and which is driven directly from the engine output shaft.

5 Claims, 5 Drawing Sheets

OFFSET DRIVE FOR BALLOON TIRED MOTORCYCLE

BACKGROUND OF THE INVENTION

This invention relates to an offset drive for a balloon tired motorcycle and more particularly to an improved compact drive arrangement for a driven wheel.

Recently, it has been proposed to equip motorcycles with large, low pressure balloon tires to adapt them for off the road use. Such balloon tires are normally inflated to a pressure in the range of 0.1 to 0.2 kg/cm$^2$ and particularly adapt the vehicle to off the road use over a wide variety of terrains. Although such vehicles have this advantage, the use of the large, low pressure balloon tire on the driven wheel presents a number of problems in connection with transferring the drive to the rear wheel. Among these problems are the spatial requirements of the final drive for the rear wheel. With final drives of the types heretofore proposed, the final drive extends outwardly a substantial lateral distance beside the rear wheel and also has a relatively large diameter. This can substantially restrict the amount of leaning which the rider may utilize when handling the vehicle. This is an obvious disadvantage.

It is, therefore, a principal object of this invention to provide an improved compact drive for the wheel of a vehicle.

It is a further object of this invention to provide a final drive for a balloon tired wheel in which the final drive does not extend laterally a significant distance outwardly from the wheel and in which the diameter of the final drive is substantially reduced.

SUMMARY OF THE INVENTION

This invention is adapted to be embodied in a vehicle having a frame means, a dirigible front wheel supported by the frame means, power means supported by the frame means and driving an output shaft and a rear wheel that is supported by the frame means. In accordance with the invention, means are provided for driving the rear wheel from the output shaft that comprises a driven gear that is affixed for rotation with the rear wheel and which is disposed at least in substantial part laterally inwardly from the outer periphery of the rear wheel.

DETAILED DESCRIPTION OF THE PREFERRED EMBODIMENTS

Figure 1:
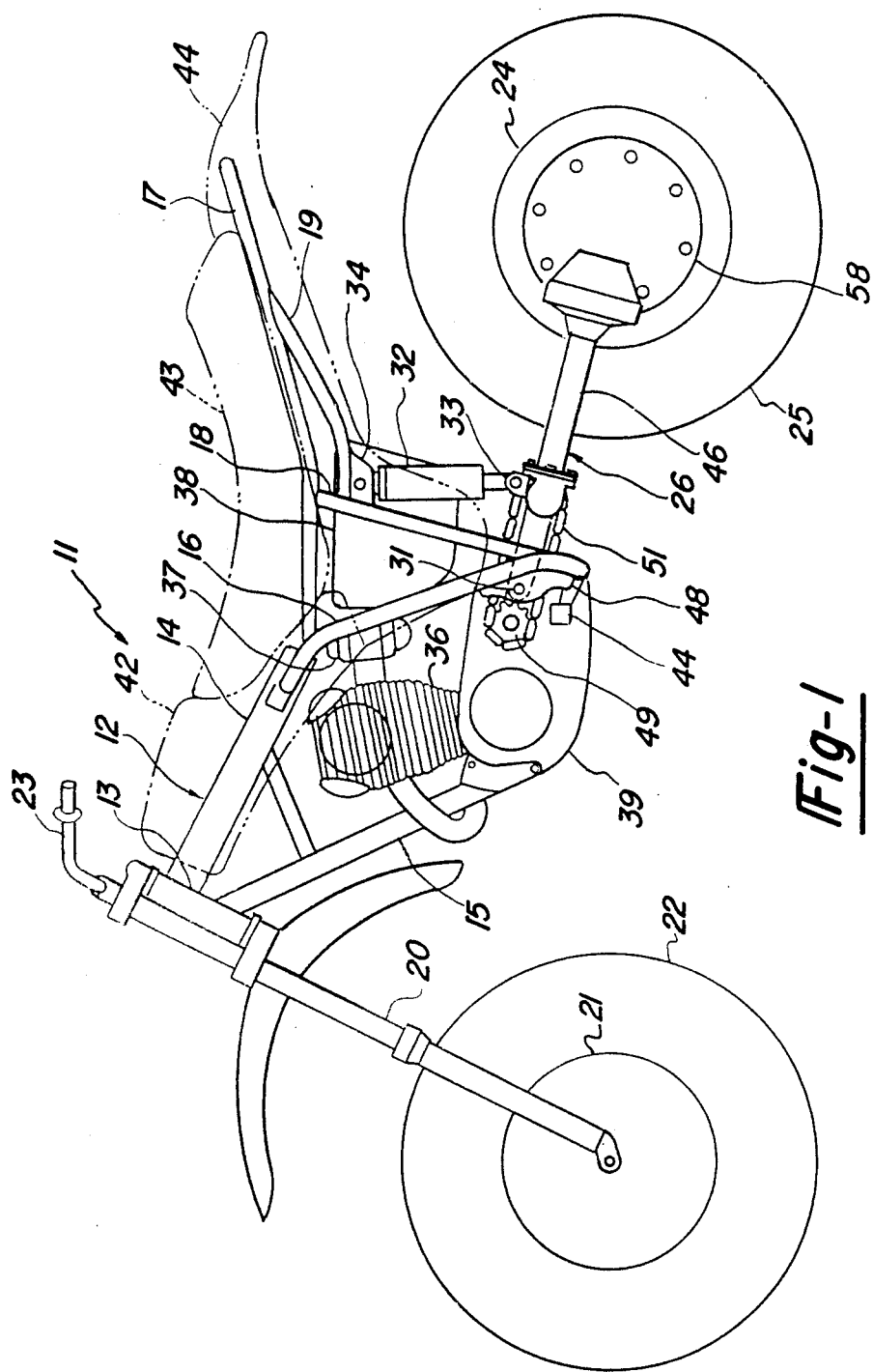
FIG. 1 is a side elevational view of a motorcycle constructed in accordance with a first embodiment of the invention and with portions shown in phantom.

Although two embodiments of the invention are illustrated and will be described, the construction of the basic motorcycle of each embodiment is the same and, for that reason, this portion of the construction of both embodiments will be described first.

The basic motorcycle in each embodiment is identified generally by the reference numeral 11. The motorcycle 11 includes a frame assembly, indicated generally by the reference numeral 12 and which may be of the welded up type. In the illustrated embodiments, the frame assembly 12 includes a head pipe 13 from which a main tube 14 extends. In addition, a pair of down tubes 15 are affixed to the head pipe 13 and extend downwardly and rearwardly. A pair of back stays 16 are affixed to the rear end of the main tube 14 and extend downwardly. Seat rails 17 are affixed to the back stays 16 and extend rearwardly. The seat rails 17 are integrally joined at their rear ends and are supported intermediate their length by means of seat pillar rails 18. In addition, reinforcing tubes 19 extend between the seat pillar rails 18 and the seat rails 17.

A dirigible front wheel 21 carrying a large, low pressure balloon tire 22 is carried at the lower end of a front fork assembly 20. The fork assembly 20 is, in turn, dirigibly supported by the head pipe 13 in a known manner and carries a handlebar 23 at its upper end for steering of the front wheel and tire 21, 22.

A rear wheel 24 carries a large, low pressure balloon tire 25. The tire 25 is at least equal to the width of the frame assembly 12 and may be larger in width than the frame assembly 12. The rear wheel and tire assembly 24, 25, is suspended by means of a trailing arm assembly, indicated generally by the reference numeral 26. The trailing arm assembly in the embodiment of FIGS. 1 through 3 differs from that of the embodiment of FIGS. 4 and 5 but both are supported for pivotal movement by means of a supporting assembly 31 carried by the frame assembly 12 and specifically in the area of the juncture between the frame tubes 16 and 18 for suspension movement of the rear wheel and tire 24, 25.

Figure 2:
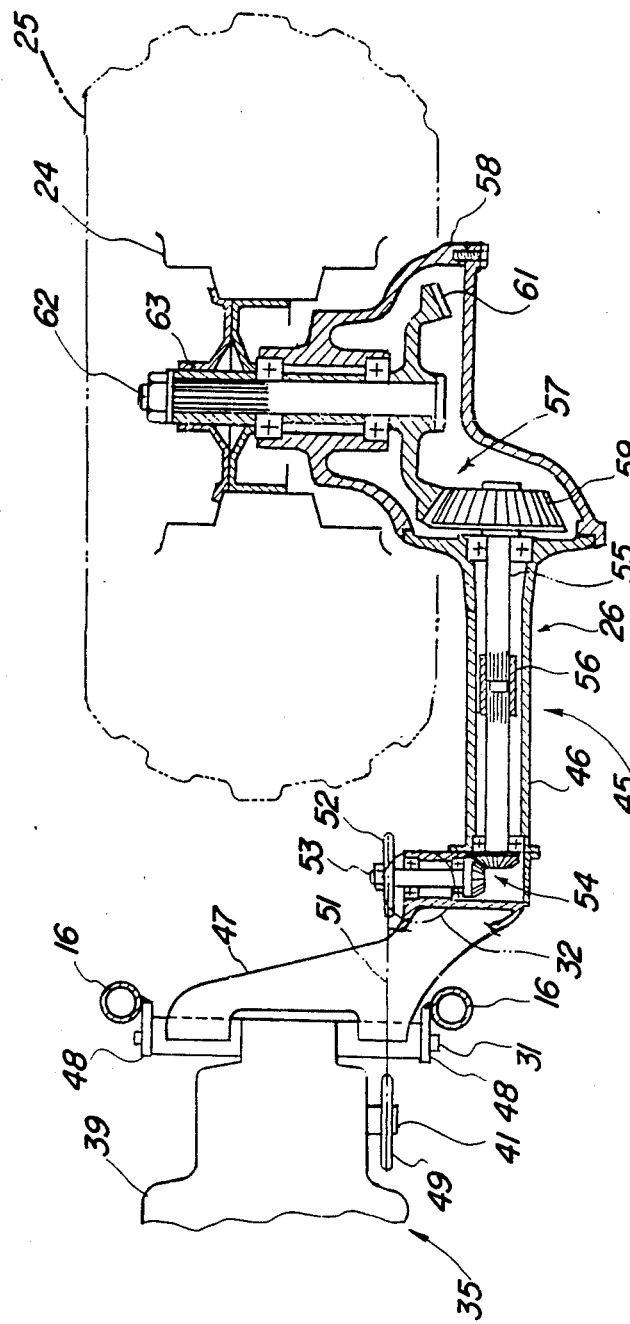
FIG. 2 is an enlarged top plan view of the rear wheel support and driving arrangement, with portions broken away and shown in section and other portions shown in phantom.
Figure 3:
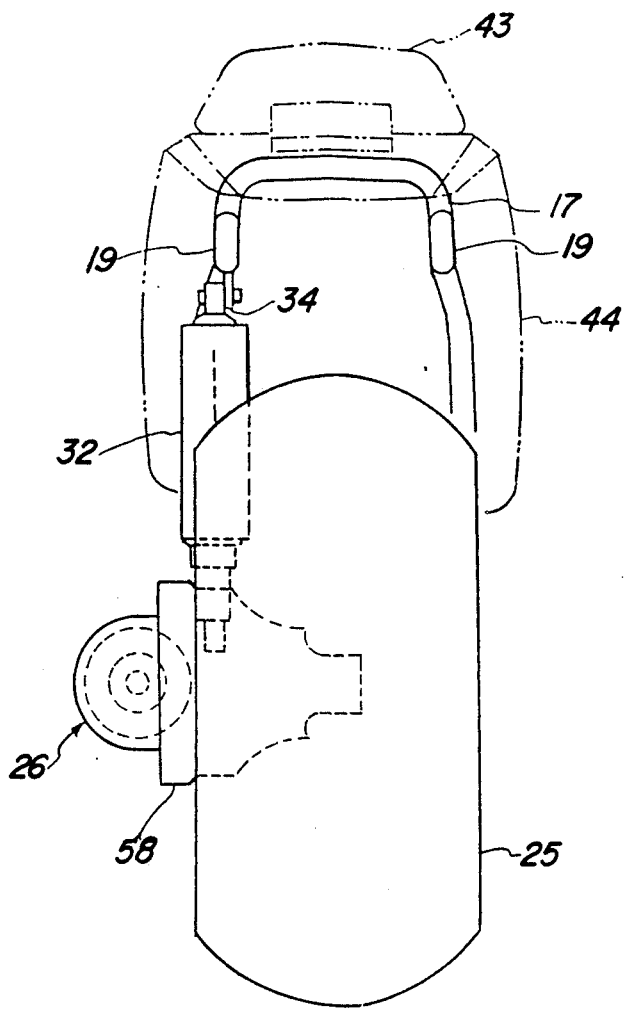
FIG. 3 is an enlarged rear elevational view of the motorcycle.

The suspension movement of the rear wheel tire assembly 24, 25, is controlled by means of a pair of combined coil spring and shock absorber assemblies 32. In the embodiment of FIGS. 1 through 3, one such assembly is used while the embodiment of FIGS. 4 and 5 uses two. These coil spring and shock absorber assemblies are loaded between the trailing arm 26 and specifically brackets 33 affixed thereto and brackets 34 carried by the reinforcing tubes 19.

A power plant, indicated generally by the reference numeral 35, is supported by the frame assembly 12. The power plant 35 includes an internal combustion engine 36 which is provided with one or more carburetors 37 for supplying a charge to the chambers of the engine 36. The carburetor 37 draws air from an air cleaner 38 that is positioned within the frame 12 rearwardly of the engine 36.

The power plant 35 also has a combined crankcase and transmission assembly 39 in which a change speed gear box is provided that drives an output shaft 41.

A fuel tank 42 is carried by the frame assembly 12 and specifically by the main tube 14 rearwardly of the head pipe 13. Behind the fuel tank 42, there is positioned a rider's seat 43 that is designed so as to accommodate a single rider. The frame assembly is provided with a pair of foot pegs 44 on opposite sides of the power plant 35 so as to accommodate the legs of a rider seated upon the seat 43.

A rear fender assembly 44 is carried by the frame assembly 12 beneath the seat 43 and overlying at least in part the rear wheel tire assembly 24, 25.

Except as heretofore noted, the construction of the embodiments of FIGS. 1 through 3 and FIGS. 4 and 5 is substantially the same. However, the manner for transferring the final drive from the engine output shaft 41 to the rear wheel 24 is different in each embodiment and the two embodiments will now be described separately.

Reference will first be had to the embodiment of FIGS. 1 through 3 wherein the final drive arrangement is shown in most detail in FIG. 2 and is identified generally by the reference numeral 45. In this embodiment, the trailing arm construction 26 is of the cantilevered type and is comprised of a tubular arm portion 46 that extends along one side of the frame assembly 12 and adjacent to one side of the rear tire wheel assembly 24, 25. The forward end of the tubular portion 46 is connected to a bridging member 47 that is journaled for pivotal movement about the pivot axis 31 by means of a pair of brackets 48 that are affixed to the frame assembly and specifically to the tubes 16.

In this embodiment, the engine output shaft 41 rotates about an axis that is disposed transversely to the longitudinal axis of the motorcycle 11. A sprocket 49 is affixed to the outwardly extending portion of the shaft 41 and drives a chain 51. The chain 51, in turn, drives a sprocket 52 that is affixed to an intermediate shaft 53 that is journaled on the trailing arm 26 adjacent the juncture between the tubular portion 46 and the bridging portion 47.

The sprocket 52 is affixed to the inner end of the intermediate shaft 53 and a bevel gear arrangement 54 transfers drive from the outer end of the intermediate shaft to one end of a drive shaft 55 that is rotatably journaled in the tubular portion 46 of the trailing arm 26. The drive shaft 55 extends parallel to the longitudinal center axis of the motorcycle 21 and includes a splined connection 56 so as to accommodate changes in length.

A final drive arrangement, indicated generally by the reference numeral 57, is provided for transferring drive from the drive shaft 55 to the rear wheel 24. The final drive 57 is contained within a final drive housing 58 and includes a pinion gear 59 that is affixed to the rear end of the drive shaft 55. The pinion gear 59 meshes with a ring gear 61 that is, in turn, affixed to a shaft 62. It should be noted that the ring gear 61 is positioned so that it is substantially inwardly disposed from the outer periphery of the rear wheel 24 and its mounted tire 25. Because of this inward mounting, it is possible to make the final drive casing 58 relatively small and of a small diameter so that it will not interfere with the ability of the rider to lean the motorcycle 21 when rounding curves or during handling operations.

The shaft 62 is journaled for rotation within the final drive housing 58 and has a splined connection to a hub 63 of the rear wheel 24 so as to drive the rear wheel 24 and its mounted tire.

Figure 4:
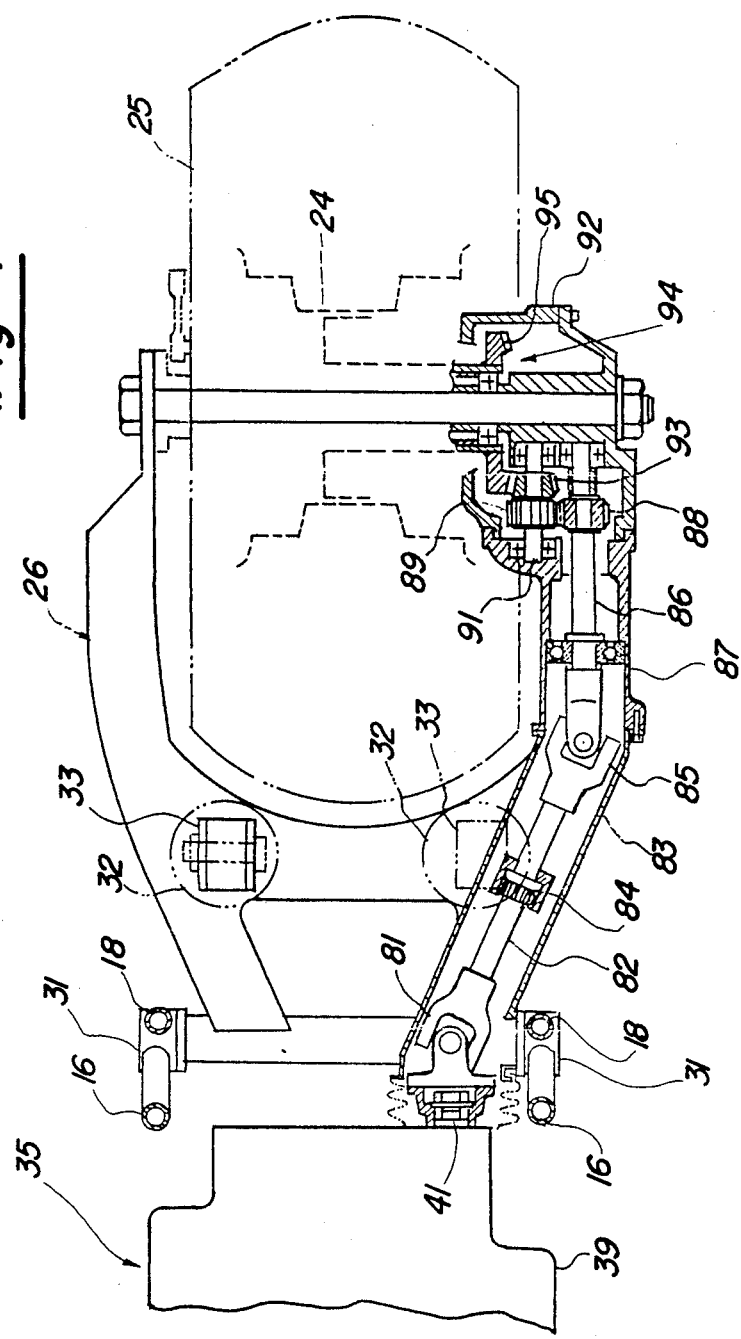
FIG. 4 is a top plan view, in part similar to FIG. 2, showing the rear wheel suspension and drive arrangement in accordance with another embodiment of the invention, with portions broken away and shown in section and other portions shown in phantom.
Figure 5:
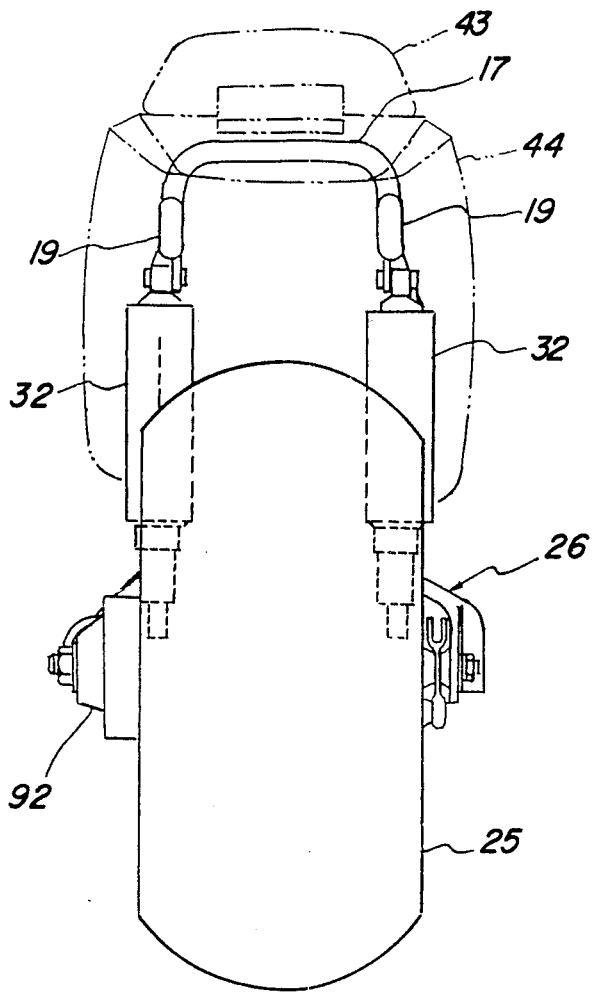
FIG. 5 is a rear elevational view of the embodiment shown in FIG. 4.

Referring now to the embodiment of FIGS. 4 and 5, in this embodiment, the engine output shaft 41 routes about an axis that extends parallel to the longitudinal axis of the motorcycle. The engine output shaft 41 is connected by means of a universal joint 81 to a first section 82 of a drive shaft assembly. The section 82 is contained within a tubular portion 83 of the trailing arm assembly 26. It should be noted that the universal joint 81 is disposed so that it lies on the pivot axis 31 so as to accommodate suspension movement. In addition, a splined connection 84 is provided intermediate the ends of the drive shaft section 82 so as to accommodate changes in length.

The drive shaft section 82 is connected by means of a second universal joint 85 to a second drive shaft portion 86. The drive shaft portion 86 is journaled within a tubular part 87 of the trailing arm by means of a pair of spaced apart bearings. Intermediate the bearings, a spur gear 88 is affixed to the drive shaft 86. It should be noted that the axis of rotation of the drive shaft portion 86 is parallel to the longitudinal center axis of the motorcycle while the axis of rotation of the drive shaft portion 82 is inclined at an angle to this axis in plan view.

The spur gear 88 is in mesh with a spur gear 89 that is carried by a stub shaft 91 which is journaled within a final drive housing, indicated generally by the reference numeral 92. The gears 88 and 99 comprise transfer gears for driving a pinion gear 93 of a final drive assembly, indicated generally by the reference numeral 94. The pinion gear 93 is affixed for rotation with the spur gear 89 and is in mesh with a ring gear 95 that is affixed for rotation with the hub of the wheel 24. This ring gear 95 is positioned laterally inwardly from the outer periphery of the wheel 24 and tire 25 so that the final drive housing 92 can be extremely compact and will not interfere with leaning of the motorcycle.

It should be readily apparent from the foregoing description that the two embodiments of the invention illustrated and described are highly effective in producing an efficient and yet compact final drive for the rear wheel of a balloon tired motorcycle without interferring with the leaning of the motorcycle during handling. Although two embodiments of the invention have been illustrated and described, other changes and modifications may be made without departing from the spirit and scope of the invention, as defined by the appended claims.

We claim:

1. In a motorcycle having a frame means, a dirigible front wheel supported by said frame means, power means supported by said frame means and driving an output shaft, a rear wheel supported by said frame means a low pressure balloon tire mounted upon said rear wheel, said rear wheel and mounted tire having a width at least equal to the width of said frame means, the improvement comprising means for driving said rear wheel from said output shaft comprising a driven ring gear affixed for rotation with said rear wheel and having its teeth disposed at least in substantial part laterally inwardly from the outer periphery of said rear wheel, and a pinion gear driven from said engine output shaft and in mesh with said ring gear.

2. In a vehicle as set forth in claim 1 wherein the pinion gear is affixed to one end of a drive shaft that extends parallel to the longitudinal center line of the frame and which is driven at its opposite end from the engine output shaft.

3. In a vehicle as set forth in claim 2 wherein the other end of the drive shaft is driven by means of a chain drive.

4. In a vehicle as set forth in claim 1 wherein the pinion gear is driven from a drive shaft by means of a pair of spur transfer gears.

5. In a vehicle as set forth in claim 4 wherein the other end of the drive shaft is driven from the engine output shaft by means of a universal joint connection to an angularly disposed drive shaft section.

* * * * *